United States Patent

Perez-Lopez

[11] Patent Number: 6,106,389
[45] Date of Patent: Aug. 22, 2000

[54] STRAW WALKERS HAVING A SUPPLEMENTARY SEPARATOR

[75] Inventor: Antonio Perez-Lopez, Contwig, Germany

[73] Assignee: Deere & Company, Moline, Ill.

[21] Appl. No.: 09/035,184

[22] Filed: Mar. 5, 1998

[30] Foreign Application Priority Data

Mar. 7, 1997 [DE] Germany .......................... 197 09 400

[51] Int. Cl.[7] .................................................. A01F 12/00
[52] U.S. Cl. ............................................. 460/85; 460/101
[58] Field of Search ................................ 460/85, 86, 87, 460/88, 89, 8, 144, 145, 901, 101

[56] References Cited

U.S. PATENT DOCUMENTS 798,957  9/1905  Good ........................................... 460/8

FOREIGN PATENT DOCUMENTS

| | | |
|---|---|---|
| 1473891 | 3/1967 | France . |
| 2029698 | 10/1970 | France . |
| 2222009 | 10/1974 | France . |
| 2342022 | 9/1977 | France . |
| 1582412 | 6/1970 | Germany . |
| 1904406 | 11/1970 | Germany . |
| 2103981 | 9/1972 | Germany . |
| 2235061 | 2/1974 | Germany . |
| 2419268 | 6/1975 | Germany . |
| 2431588 | 5/1976 | Germany . |
| 2512150 | 7/1976 | Germany . |
| 3211177 | 10/1982 | Germany . |
| 4209020 | 9/1983 | Germany . |
| 3621995 | 1/1988 | Germany . |
| 4127118 | 2/1993 | Germany . |
| 843 842 | 7/1981 | U.S.S.R. ................................ 460/101 |
| 698324 | 10/1953 | United Kingdom . |
| 1213985 | 11/1970 | United Kingdom . |

*Primary Examiner*—Robert E. Pezzuto

[57] ABSTRACT

A supplementary separator for a combine having straw walkers. The supplementary separator comprising a rotor transversely arranged above the straw walkers. The rotor is provided with a rotatable housing having an eccentric axle located therein. A plurality of freely rotatable tines are mounted to the eccentric axle and extend outwardly from the rotor housing for engaging the crop mat on the straw walkers. The rotor is rotated to overshot convey the crop mat on the straw walkers.

6 Claims, 2 Drawing Sheets

STRAW WALKERS HAVING A SUPPLEMENTARY SEPARATOR

BACKGROUND OF THE INVENTION

1. Field of the Invention

The invention is directed to a combine having straw walkers. A rotatable rotor is located above the straw walkers and is provided with tines eccentrically supported in bearings in the rotor housing which project outwardly therefrom for engaging the crop mat on the straw walkers.

2. Description of the Prior Art

DE-OS-1 904 406 discloses a combine with a tine-equipped rotor operating as an undershot conveyor located above straw walkers. This tine-equipped rotor is composed of a rotor housing, an axle supported eccentrically in bearings therein and tines rotatively supported in bearings on the axle extending through the wall of the rotor housing. During rotation of the rotor housing the tines projecting to the greatest amount at the bottom of the rotor housing are moved longitudinally in the direction of conveying the crop material from the threshing assembly to the straw walkers. The tines tear apart the mat of straw increasing in the separation of kernels still retained in the straw. To increase the rate of separation the tines are either fastened to the axle through wobble plates or the axle is constantly moved axially by means of an eccentric-drive motor. In this way the free ends of the tines also move in the axial direction of the rotor and further tear apart the straw mat.

DE-OS-22 35 061 discloses a combine in which an overshot conveyor similar to a pick-up platform is located between straw walkers and straw hood. The overshot conveyor takes up straw and redelivers it further downstream. The short straw lying at the bottom of the straw mat can then be separated. The overshot conveyor can also be provided immediately following a walker. A similar arrangement is also known from FR-PS-1,473,891 and DE-AS-2 103 981, where the arrangement according to the latter named citation can additionally be brought into a non-operating position.

According to GB-PS-698, 324 an overshot conveyor is also provided above straw walkers that consists of a drum and on which toothed strips are mounted in the trailing direction.

DE-OS-2 431 588 teaches a separator in the delivery region of the threshing assembly of a combine, that is provided with movable or flexible tines supported on a rotor which perform undershot conveying of the crop material. The tines are flexible, but always extend with their full length into the crop. It is also proposed that several such separators be arranged one after another.

According to DE-C3-42 09 020 a separator drum operating as an overhead conveyor is inserted between a threshing assembly and the straw walkers which catches the threshed crop coming from the threshing assembly and decelerates it so that kernels contained in the mass of the crop are deposited on the surface of the separator drum while the straw is passed along to the straw walkers.

DE-A1-41 27 118 shows a combine with straw walkers and a crop processing arrangement located above the walkers, which performs undershot conveying of the crop. Ahead of the crop processing arrangement a belt of tines is provided that also performs undershot conveying which tears apart the mass of crop and throws it at high speed into the slot between the crop processing arrangement and the straw walkers.

SUMMARY

The present invention is provided with tines that penetrate the crop mat and convey as well as loosen the mat. The tines project from the rotor housing for directing the crop mat over the top of the rotor loosening the crop in such a way that kernels contained in it can fall out of the mat of crop.

The possibility of changing the position of the rotor with respect to the straw walkers permits the finding of an optimum position for each crop.

Further accommodation of the rotor to the crop is possible if its rotational speed can be varied. 100 to 200 rpm promises good results under general conditions.

By changing the inclination of the tines in the radial plane the aggressiveness in conveying of the rotor can be varied, thereby avoiding problems of entanglement.

If the ends of the tines projecting out of the rotor housing are positioned transverse to the direction of conveying and are fixed in position during operation, additional loosening of the crop as well as its sideways movement is possible. This is attained by the bearing support of the tines on the axle that permits pivoting to the side. The tines are repositioned in the axial direction, transverse to the direction of conveying, by the rotor housing.

The use of a drive capable of reversing the direction of rotation permits not only a more favorable undershot conveying in individual cases, but also a reverse operation to eliminate possible jams.

The loosening and separation of the crop by means of the rotor can be enhanced if several such rotors performing undershot or overshot conveying are arranged behind each other. This is especially true, if the rotors are positioned immediately behind one another, where the crop from one rotor is delivered to the following rotor. A very effective separating performance results from the location of the rotor above the intake region to the mid region of the straw walkers.

DETAILED DESCRIPTION

Figure 1:
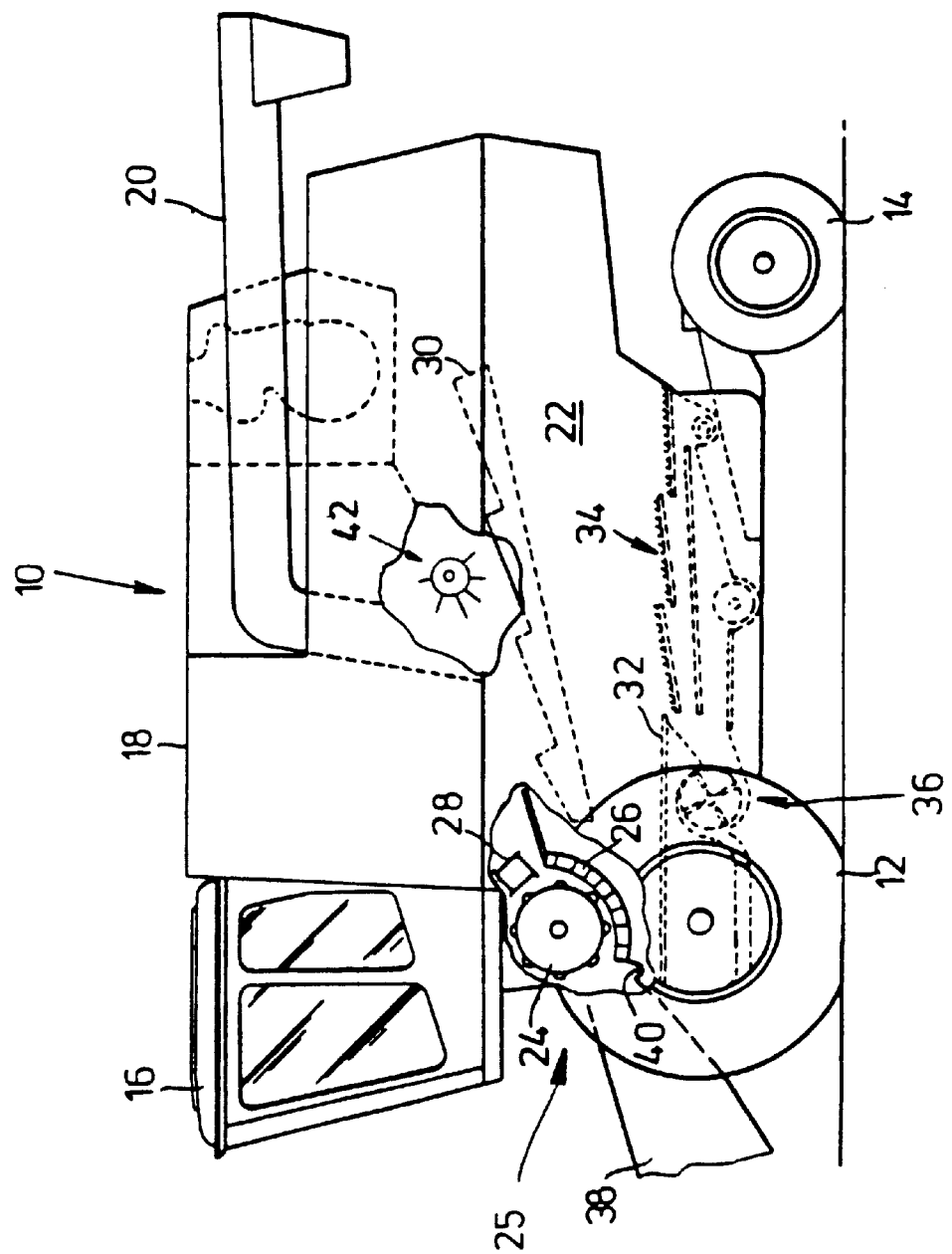
FIG. 1 is a semi-schematic side view of a combine having the present invention.

A combine 10 according to the invention shown in FIG. 1, is supported on front driven and rear steerable wheels 12 and 14, respectively. It is also equipped with an operator's cab 16 from which it can be controlled by an operator. In place of a combine a stationary threshing machine, an experimental thresher installation or the like could be considered. A grain tank 18 is located to the rear of the operator's cab 16. An unloading auger 20 is used to discharge clean grain from the grain tank 18. The grain tank 18 is supported on a frame 22 in which harvested crop material is separated into large and small components on its path over a threshing cylinder 24, a concave 26 and a beater 28. Further separation of the harvested crop material is performed on straw walkers 30 located downstream from the threshing cylinder and concave. Grain and small non-grain crop components are directed by the threshing cylinder and concave and the straw walker to grain pan 32. This grain containing the small non-grain crop components is directed to the cleaning sieves 34. A blower 36 directs an air blast upwardly through the cleaning sieves 34 so that the small non-grain crop components are blown out the rear of the combine and the clean grain falls through the sieves where it is collect and directed to the grain tank 18. The large non-grain crop components are deposited on the ground from the straw walkers 30. The harvested crop material is directed to the threshing cylinder and concave by a feederhouse 38 having a stone trap 40. A harvesting platform, not shown, or other crop recovery arrangement is used to direct the harvested crop material to the feederhouse.

Figure 2:
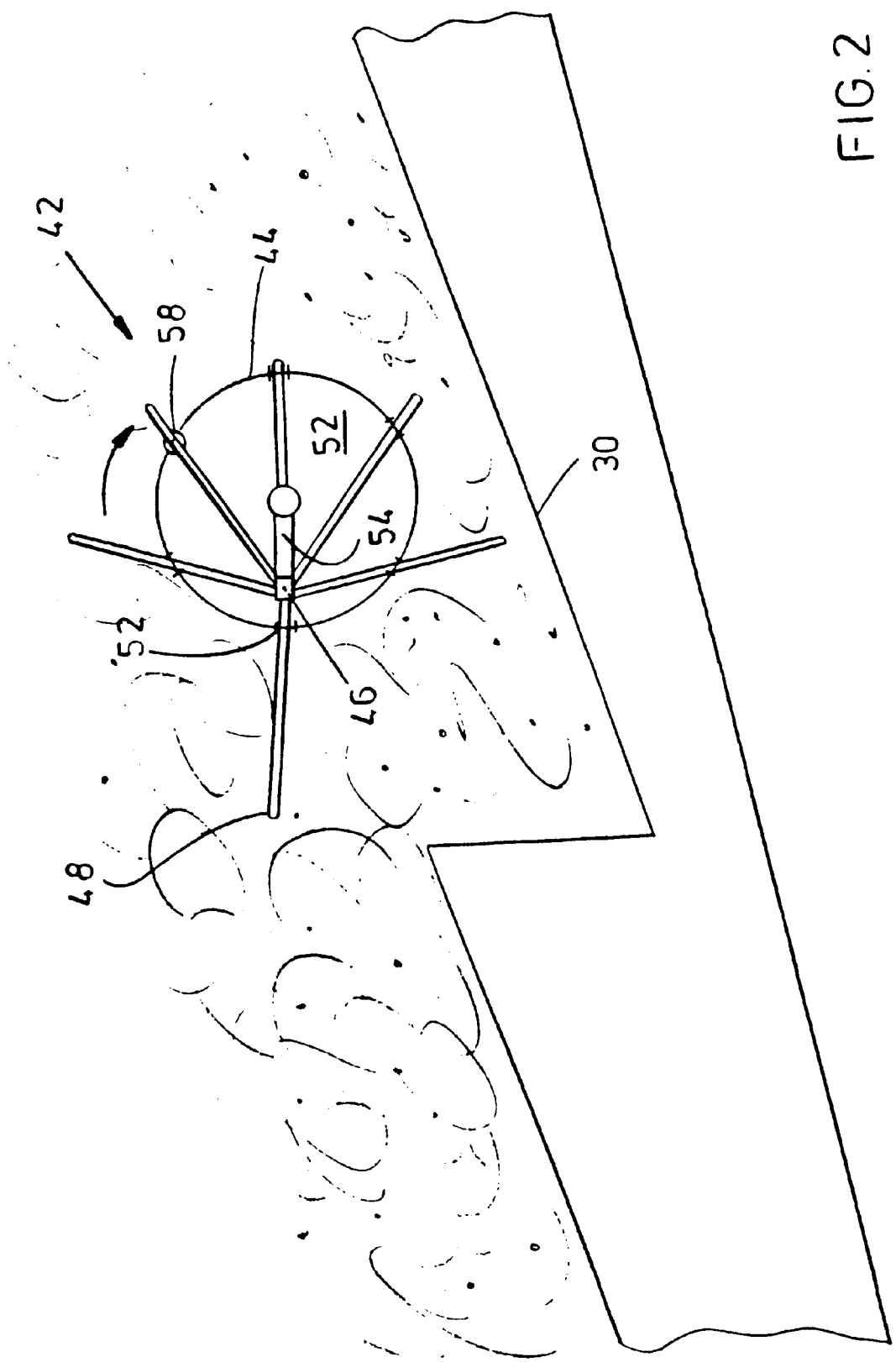
FIG. 2 is a side view of the rotor and tines.

Above the straw walkers 30 a rotor 42 is provided which is arranged about an axis of rotation transverse to the direction of travel and which is operated as a supplementary separator. The rotor 42 is composed of a rotor housing 44, an axle 46 and tines 48. The rotor housing 44 is configured as a hollow cylinder containing a multitude of openings 50. The openings 50 are arranged in rows parallel to the axis of rotation and the longitudinal centerline of the rotor housing 44. The openings 50 are spaced at a distance from each other, in order for each to accommodate a tine 48. The rotor housing 44 is supported in bearings and is free to rotate, in the frame 22 of the combine 10. As seen in FIG. 2 the rotation is clockwise, for performing overshot conveying. For this purpose a drive means, not shown, is provided. The drive means may comprise, belt pulleys mounted to the end walls 52 of the rotor housing 44, that transmit rotation originating with a motor.

The rotor housing 44 is preferably positioned in the central region above the straw walkers 30. This position can be varied in the vertical as well as the horizontal direction by means of a corresponding guide.

Alternatively the rotor 42 could also be provided immediately downstream of the deflecting drum 28.

The drive means may be configured in a multitude of ways and may contain, for example, a variable-speed gearbox and/or a reversing gearbox, with which the rotational speed of the rotor housing 44 can be varied and its direction of rotation can be reversed.

In this way the rotor 42 can be driven so as to perform overshot as well as undershot conveying. If necessary, the position of the levers 54 and therewith that of the tines 48 must be changed to comply.

The axle 46 is eccentrically supported in bearings on levers 54 in the rotor housing 44 and engages the tines 48. The tines are free to rotate relative to the axle. The tines are also fixed axially, in tine retainers 56. The position of the levers 54 can be repositioned by means that are not shown but are in themselves well known, whereby the inclination of the tines 48, their current projection beyond the rotor housing 44 and thereby their penetration into the crop being conveyed can be varied.

The tines 48 are configured as straight rods, but may also be curved in a trailing direction with respect to the direction of rotation. The tines 48 are all of the same length, but project outward to differing amounts beyond the rotor housing 44 on the basis of the eccentric position of the axle 46 in the rotor housing 44. The tines 48 are freely rotatively supported, by means of the blade retainers on the axle 46 and are pivotally supported in bearing balls 58 in the rotor housing 44. The tines are designed for overshot conveying, that is, for overhead conveying of the crop to be conveyed from a forward section of the straw walkers 30 to a rear section.

The preceding description shows that the configuration of the rotor 42 and its arrangement essentially correspond to the configuration and arrangement of the central region of a screw conveyor of a cutter head or a pick-up, which are adequately known.

I claim:

1. A supplementary separator for a combine having straw walkers, comprising a rotor rotatively mounted to the combine above the straw walkers, the rotor having a rotor housing with an eccentric axle located therein, a plurality of tines are mounted to the eccentric axle and extend outwardly from the rotor housing for overshot conveying crop material located on the straw walkers, wherein the position of the rotor relative to the straw walkers can be varied in one of a horizontal and a vertical direction.

2. A supplementary separator for a combine having straw walkers, comprising a rotor rotatively mounted to the combine above the straw walkers, the rotor having a rotor housing with an eccentric axle located therein, a plurality of tines are mounted to the eccentric axle and extend outwardly from the rotor housing for overshot conveying crop material located on the straw walkers, wherein the position of the rotor relative to the straw walkers can be varied in a horizontal and a vertical direction.

3. A supplementary separator for a combine having straw walkers, comprising a rotor rotatively mounted to the combine above the straw walkers the rotor having a rotor housing with an eccentric axle located therein, a plurality of tines are mounted to the eccentric axle and extend outwardly from the rotor housing for overshot conveying crop material located on the straw walkers, wherein the rotational speed of the rotor can be varied between 100 to 200 rpm.

4. A supplementary separator for a combine having straw walkers, comprising a rotor rotatively mounted to the combine above the straw walkers the rotor having a rotor housing with an eccentric axle located therein, a plurality of tines are mounted to the eccentric axle and extend outwardly from the rotor housing for overshot conveying crop material located on the straw walkers, wherein the rotor that is arranged above an intake region of the straw walkers.

5. A supplementary separator for a combine having straw walkers, comprising a rotor rotatively mounted to the combine above the straw walkers the rotor having a rotor housing with an eccentric axle located therein, a plurality of tines are mounted to the eccentric axle and extend outwardly from the rotor housing for overshot conveying crop material located on the straw walkers, wherein the eccentric axle can be shifted axially with respect to the rotor and that can be fixed at various inclinations within a plane through the axis of rotation of the rotor.

6. A supplementary separator for a combine having straw walkers, comprising a rotor rotatively mounted to the combine above the straw walkers the rotor having a rotor housing with an eccentric axle located therein, a plurality of tines are mounted to the eccentric axle and extend outwardly from the rotor housing for overshot conveying crop material located on the straw walkers, wherein the rotor is provided with a gearbox that can reverse direction of rotation of the rotor.

\* \* \* \* \*